April 13, 1943.  F. ROTH  2,316,488
BIMETAL VALVE
Filed May 27, 1942
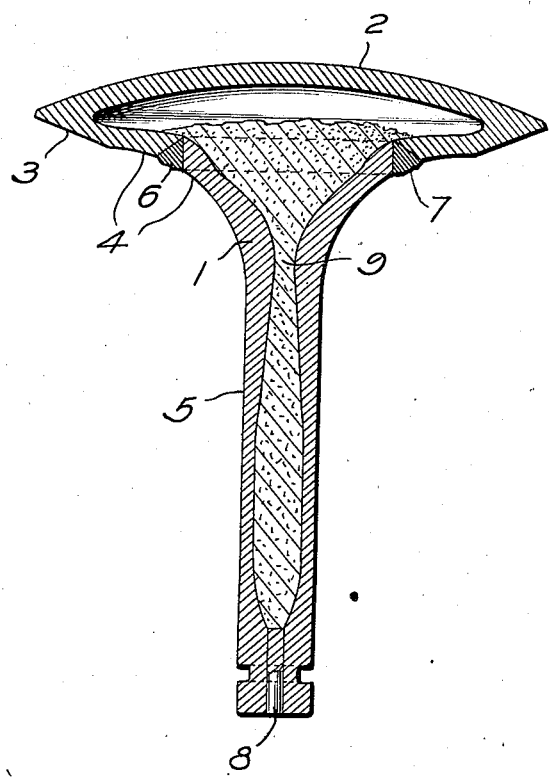
INVENTOR.
FRANK ROTH,
BY
Ellis S. Middleton
ATTORNEY.

Patented Apr. 13, 1943

2,316,488

UNITED STATES PATENT OFFICE 2,316,488

BIMETAL VALVE

Frank Roth, Pelham Manor, N. Y.

Application May 27, 1942, Serial No. 444,633

7 Claims. (Cl. 123—188)

This invention relates to a valve adapted for use in internal combustion engines, and more particularly to an internal combustion engine valve which is cast of a high temperature resistant material.

A satisfactory valve for use in an internal combustion engine must possess not only strength to withstand the mechanical abuse occurring in the operation of such an engine, but also ability to resist the high temperatures prevailing therein. In the past, numerous attempts have been made to provide a valve possessing both these characteristics, but none of these attempts has been entirely successful. It has been proposed to cast valves of certain steel alloys, such as nickel steel, tungsten steel, and silicon-chrome steel, which are known to possess superior heat resistance qualities. Such valves, however, are not only expensive due to the great number of fabricating operations which must be performed, but they are also susceptible to corrosion and erosion by the hot exhaust gas mixtures, and therefore, rapidly become surface pitted with consequent loss of efficiency in the engines in which they are used.

Valves comprising steel stems of high mechanical strength and relatively low temperature resistance, and heads of high alloy steel welded thereon have also been proposed. In some instances, these valves have proven more satisfactory than the foregoing, but they also possess several undesirable features, foremost of which is the contamination of the high alloy head by the lower grade stem metal during the fusion welding operation, with consequent decrease in high temperature resistance of the high alloy head. A second disadvantage lies in the different thermalcritical transformations which the two grades of steel necessarily undergo. These differences of transformation temperature result in differential expansion rates and differential expansion cycles which very markedly contribute to distortion and shrinkage of the valves. A further disadvantage of the foregoing system lies in the metallurgical damage which fusion welding inevitably causes in highly alloyed or high carbon steels. The heat affected or martensitic zone which forms some distance from the weld will be brittle, and may be the cause of a serious failure during operation. A failure of this type may be caused by fatigue and thus not be susceptible to checking by normal tensile test methods.

I am also cognizant of the fact that valves are being made from steels of the austenitic chrome-nickel type and having a welded-on seating surface of metal of the same general analysis as that which I shall hereinafter specify as my primary choice. This type of valve, while satisfactory for use in ordinary internal combustion engines of low compression ratios, has not proven successful in modern internal combustion engines for military aircraft or in modern high speed Diesel engines. The reason for this lack of success lies in the contamination of the seating surface metal by the base metal of the valve during the welding-on operation.

Most of the above disadvantages have been overcome by the valve described and claimed in my copending application, Serial No. 444,632, filed May 27, 1942. This valve is cast entirely of a basically cobalt-chromium alloy containing less than 3% of iron and may be cast either solid as a homogeneous unit or hollow with the head cap welded onto the stem. As pointed out in detail in the above referred to application, many advantages accrue to the use of such a valve due in part to the inherent characteristics of the type alloy, i. e., high temperature resistance, low coefficient of friction, and the like, and in part to the integral construction thereof which results in a uniform coefficient of expansion throughout the entire temperature range to which the valve may be subjected and which avoids the contamination of the high alloy head by the lower grade stem metal during the fusion welding operation occurring in prior art valves of bimetal construction. One rather vital disadvantage still remains, however, when a hollow valve cast entirely of the basically cobalt-chromium alloy containing less than 3% iron is utilized in aircraft and other high compression internal combustion engines. This disadvantage arises from the insufficient tensile strength of the thin-stem of the hollow valve to stand the required loads.

I have discovered that this remaining disadvantage may be overcome by a bimetal valve having a particular construction.

According to the present invention, a valve of bimetal construction having a stem made of silchrome or other standard valve steel and a head piece which is cast of a basically cobalt-chromium alloy containing less than 3% iron and which comprises the domed head of the valve, the valve seating surface, and a section part way down the curve at the neck of the valve has been found entirely satisfactory in high compression internal combustion engines. The stem and head piece are welded together by either automatic or manual means.

I prefer to manufacture the head piece of the valves of the present invention from an alloy known as Stellite No. 6, which has the following composition:

| | Per cent |
|---|---|
| Cobalt, minimum | 55 |
| Chromium | 23–35 |
| Tungsten | 3–6 |
| Carbon | Less than 2 |
| Iron | Less than 3 | the difference between these analyses and 100% made up with cobalt; or one known as vitalium with the following composition:

| | Per cent |
|---|---|
| Cobalt, minimum | 55 |
| Chromium | 23–35 |
| Molybdenum | 3–6 |
| Carbon | Less than 2 |
| Iron | Less than 3 | the difference between these analyses and 100% being cobalt. It should be understood, however, that these particular alloys are merely preferred embodiments, and the invention is not to be construed as limited thereto. Satisfactory results may also be obtained from alloys containing a minimum of 55% cobalt, and 23% chromium, with a small percentage of molybdenum, tantalum, boron, silicon, manganese, titanium, columbium, beryllium or the like, either alone or in combination.

Similarly, while silchrome having the following well-known composition:

| | Per cent |
|---|---|
| Chromium | 9 to 25 |
| Nickel | 0 to 5 |
| Silicon | 0 to 3 |
| Carbon | 0.5 to 0.7 |
| Molybdenum | 0 to 3 |
| Iron | Remainder | is the preferred stem alloy, I do not wish to be limited to its use alone and equally satisfactory results may be obtained when other standard valve steels are substituted therefor.

Due to the particular location of the welded joint in the valve of the present invention, none of the disadvantages found in prior art valves of bimetal construction are realized. In prior art valves, the welded joints are at the seating surface; in other words, the weakest point of the valve unit is located at the point of greatest stress. This is not true of the valve of the present invention wherein the domed head of the valve, its seating surface and a section part way down the curve at its neck comprise the high temperature resistant alloy.

It is an advantage of the present invention that the hollow construction of the valve makes it adaptable to salt or sodium cooling. This type cooling must necessarily be contemplated by any successful commercial application at this time.

It is a further advantage of the present invention that a considerable saving in the basically cobalt-chromium alloy containing less than 3% iron over the amount required for valves manufactured entirely of that type alloy may be effected.

The valve of the present invention is illustrated in the accompanying drawing in which Fig. 1 is a longitudinal sectional view of a valve of bimetal construction.

The valve 1 comprises a domed head 2, a suitably beveled seating surface 3, and a neck or throat portion 4. This head piece is welded onto a hollow stem 5 at 6 and 7. The hollow stem 5 is provided with a filling plug 8 and may or may not, as is desired, be filled with sodium or a suitable salt 9 for cooling.

While the invention has been shown and described with specific reference to specific embodiments, it is to be understood that it is not to be limited thereto but is to be restricted solely by the scope of the appended claims.

I claim:

1. A valve of bimetal construction suitable for use in internal combustion engines which comprises a hollow stem of a high tensile strength alloy and a hollow head piece of a high temperature resistant alloy, said head piece comprising a domed head, a seating surface and including a section part way down the curve at the neck of the finished valve, said hollow stem and head piece being welded together below said seating surface.

2. A valve of bimetal construction suitable for use in internal combustion engines which comprises a hollow stem of a high tensile strength steel and a hollow head piece of an alloy consisting of at least 55% cobalt, 23%–35% chromium, a maximum of 3% iron, a maximum of 2% carbon, and a small percentage of a metal selected from the group consisting of tungsten, molybdenum, tantalum, boron, silicon, manganese, titanium, columbium and beryllium, said head piece comprising a domed head, a seating surface, and including a section part way down the curve at the neck of the finished valve, said hollow stem and head piece being welded together below said seating surface.

3. A valve of bimetal construction suitable for use in high compression internal combustion engines which comprises a hollow stem of silchrome and a hollow head piece of an alloy consisting of at least 55% cobalt, 23%–35% chromium, 3%–6% tungsten, a maximum of 3% iron, and a maximum of 2% carbon, said head piece comprising a domed head, a seating surface, and including a section part way down the curve at the neck of the finished valve said hollow stem and head piece being welded together below said seating surface.

4. A valve of bimetal construction suitable for use in high compression internal combustion engines which comprises a hollow stem of silchrome and a hollow head piece of an alloy consisting of at least 55% cobalt, 23%–35% chromium, 3%–6% molybdenum, a maximum of 3% iron and a maximum of 2% carbon, said head piece comprising a domed head, a seating surface, and including a section part way down the curve at the neck of the finished valve and said hollow stem and head piece being welded together below said seating surface.

5. A valve of bimetal construction suitable for use in high compression internal combustion engines which comprises a hollow stem provided at one end with a plug and filled with a member of the group consisting of sodium and suitable salts and a hollow head piece of an alloy consisting of at least 55% cobalt, 23%–35% chromium, a maximum of 3% iron, a maximum of 2% carbon, and a small percentage of a metal selected from the group consisting of tungsten, molybdenum, tantalum, boron, silicon, manganese, titanium, columbium and beryllium, said head piece comprising a domed head, a seating surface, and including a section part way down the curve at the neck of the finished valve, said hollow steam and head piece being welded together below said seating surface.

6. A valve of bimetal construction suitable for use in high compression internal combustion engines which comprises a hollow stem provided at one end with a plug and filled with sodium and a hollow head piece of an alloy consisting of at least 55% cobalt, 23%–35% chromium, 3%–6% tungsten, a maximum of 3% iron, and a maximum of 2% carbon, said head piece comprising a domed head, a seating surface, and including a section part way down the curve at the neck of the finished valve, said hollow stem and head piece being welded together below said seating surface.

7. A valve of bimetal construction suitable for use in high compression internal combustion engines which comprises a hollow stem provided at one end with a plug and filled with sodium and a hollow head piece of an alloy consisting of at least 55% cobalt, 23%–25% chromium, 3%–6% molybdenum, a maximum of 3% iron, and a maximum of 2% carbon, said head piece comprising a domed head, a seating surface, and including a section part way down the curve at the neck of the finished valve, said hollow stem and head piece being welded together below said seating surface.

FRANK ROTH.